United States Patent
Lovette

(10) Patent No.: US 7,380,245 B1
(45) Date of Patent: May 27, 2008

(54) TECHNIQUE FOR DETECTING CORRUPTION ASSOCIATED WITH A STACK IN A STORAGE DEVICE

(75) Inventor: Steven Eugene Lovette, Keller, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/197,993

(22) Filed: Nov. 23, 1998

(51) Int. Cl.
*G06F 9/46* (2006.01)

(52) U.S. Cl. .................... 718/100; 712/227; 712/202; 711/132; 711/152; 726/16; 726/26; 709/200; 709/215

(58) Field of Classification Search ............... 709/100, 709/104, 228, 238, 321, 200, 215; 370/342, 370/412, 514; 711/148, 100, 110, 132; 712/202, 712/39, 243; 713/200; 715/530; 714/38, 714/35; 726/5; 717/130, 140, 141; 718/100
See application file for complete search history.

(56) References Cited

U.S. PATENT DOCUMENTS

| | | | |
|---|---|---|---|
| 5,107,457 A * | 4/1992 | Hayes et al. ................ 711/132 |
| 5,222,220 A * | 6/1993 | Mehta ......................... 714/38 |
| 5,535,329 A * | 7/1996 | Hastings ..................... 714/35 |
| 5,572,698 A * | 11/1996 | Yen et al. .................... 711/110 |
| 5,628,016 A * | 5/1997 | Kukol ......................... 717/140 |
| 5,630,066 A * | 5/1997 | Gosling ...................... 709/221 |
| 5,890,181 A * | 3/1999 | Selesky et al. ............. 715/530 |
| 5,907,709 A * | 5/1999 | Cantey et al. .............. 717/141 |
| 5,949,973 A * | 9/1999 | Yarom ........................ 713/200 |
| 5,950,221 A * | 9/1999 | Draves et al. .............. 711/100 |
| 5,968,169 A * | 10/1999 | Pickett ....................... 712/239 |
| 6,006,323 A * | 12/1999 | Ma et al. .................... 712/202 |
| 6,070,198 A * | 5/2000 | Krause et al. .............. 709/321 |
| 6,157,999 A * | 12/2000 | Rossbach et al. .......... 712/243 |
| 6,161,219 A * | 12/2000 | Ramkumar et al. ........ 717/130 |
| 6,941,473 B2 * | 9/2005 | Etoh et al. .................... 726/5 |

OTHER PUBLICATIONS

Simon L Peyton Jones and Jon Salkild, The Spineless Tagless G-machine, 1990, ACM Press, Series-Proceeding-Article, ISBN-0-89791-328-0, pp. 184-201.*
Cowan et al., "StackGuard: Automatic Adaptive Detection and Prevention of Buffer-Overflow Attacks", Dec. 9, 1997, http://cse.ogi.edu/DISC/projects/immunix, 14 pages.*

* cited by examiner

*Primary Examiner*—Dustin Nguyen

(57) ABSTRACT

A technique for detecting corruption associated with a stack in a storage device is disclosed. In one embodiment, the technique is realized by having a processing device insert a quantity of information adjacent to the stack in the storage device, wherein the quantity of information has an initial state. The processing device then inspects the quantity of information so as to identify any deviation from the initial state and thereby detect corruption associated with the stack in the storage device.

18 Claims, 2 Drawing Sheets

TECHNIQUE FOR DETECTING CORRUPTION ASSOCIATED WITH A STACK IN A STORAGE DEVICE

BACKGROUND OF THE INVENTION

1. Field of the Invention

The present invention relates generally to multi-tasking systems and, more particularly, to a technique for detecting corruption associated with a stack in a storage device.

2. Background of the Present Invention

A real time embedded system often provides a multi-tasking environment in order to meet diverse application requirements. In a multi-tasking environment, an individual stack (i.e., an individual work space) is typically required for each task. Each stack provides a location, or a group of locations, where dynamic function variables may be stored as needed for a corresponding task. Typically, each stack is allocated a dedicated range of sequential memory, although a stack can also be allocated a dedicated space of non-sequential memory. Regardless, stacks have always had problems in the areas of overflow and underflow.

Stack overflow occurs when the stack memory is insufficient to meet workload demand. Stack underflow occurs when a task attempts to pop too many function variables off of the stack. The net result of either operation is the corruption of adjacent memory. Corruption of adjacent memory results in non-predictable behavior and difficult to impossible casual analysis of the problem (i.e., finding the source of the problem).

Traditional solutions to stack overflow and underflow problems are to either significantly over-allocate stack memory or use hardware write protect schemes. The first solution basically ignores the problem, hoping but not ensuring that it never happens. Since stack corruption is a dynamic condition, this solution is fraught with shortcomings. The second solution solves the detection problem, but at the cost of additional hardware complexity and corresponding hardware failure rates.

A software solution to the above-described stack overflow and underflow problems is to keep track of the number of function variables that are on the stack by adding one (i.e., +1) to a counter whenever a push operation occurs, and by subtracting one (i.e., −1) from the counter whenever a pop operation occurs. However, whenever a complex push/pop operation is performed (i.e., when push/pop operations are performed in a number of different places), it is difficult to ensure that all such places perform the requisite addition/subtraction operation. As an alternative, a centralized procedure and/or function for performing the push and pop operations can be created, wherein the appropriate addition and subtraction operations are performed therein. However, this requires calling such procedures and/or functions, which requires additional memory space and processor time.

In view of the foregoing, it would be desirable to provide a technique for overcoming the above-described stack overflow and underflow problems, while also overcoming the shortcomings of the above-described prior art solutions. More particularly, it would be desirable to provide a technique for detecting stack corruption in a multi-tasking environment.

OBJECTS OF THE PRESENT INVENTION

The primary object of the present invention is to provide a technique for detecting corruption associated with a stack in a storage device.

The above-stated primary object, as well as other objects, features, and advantages, of the present invention will become readily apparent from the following detailed description which is to be read in conjunction with the appended drawings.

SUMMARY OF THE INVENTION

According to the present invention, a technique for detecting corruption associated with a stack in a storage device is provided. The technique is beneficially utilized in a multi-tasking environment wherein a processor typically performs a task by retrieving a message from a message queue and processing the message by calling, or invoking, one or more specific functions which are required to perform the task based upon information contained in the message. For each task there is a stack formed in a storage device, for example a memory device, for storing function variables as needed for performing the corresponding task. The corruption associated with the stack can arise as a result of a faulty task, function, or the stack itself.

The technique can be realized by having a processing device such as, for example, a digital microprocessor, insert a quantity of information adjacent to the stack in the storage device. The quantity of information has an initial state which can represent a variety of predetermined configurations such as, for example, a bit pattern, a processor readable address, or a processor readable instruction. After the quantity of information has been inserted adjacent to the stack in the storage device, the processing device inspects the quantity of information after certain operations occur so as to identify any deviation from the initial state and thereby detect corruption associated with the stack in the storage device.

In a first operation, data is added to the stack after the quantity of information has been inserted adjacent to the stack in the storage device. This first operation, which is typically referred to as a push operation, can cause the quantity of information to deviate from the initial state. If upon inspection such a deviation is identified, then the push operation is recorded and remedial measures can be taken.

In a second operation, data is removed from the stack after the quantity of information has been inserted adjacent to the stack in the storage device. This second operation, which is typically referred to as a pop operation, can also cause the quantity of information to deviate from the initial state. If upon inspection such a deviation is identified, then the pop operation is recorded and remedial measures can be taken.

After a deviation from the initial state has been identified, the processing device typically restores the quantity of information to the initial state, thereby allowing the detection of any subsequent deviations from the initial state.

In one aspect of the present invention, the processing device inserts a first quantity of information adjacent to a top of the stack in the storage device, and inserts a second quantity of information adjacent to the bottom of the stack in the storage device. This aspect of the present invention allows both stack overflow and stack underflow conditions to be detected.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EXEMPLARY EMBODIMENT

Figure 1:
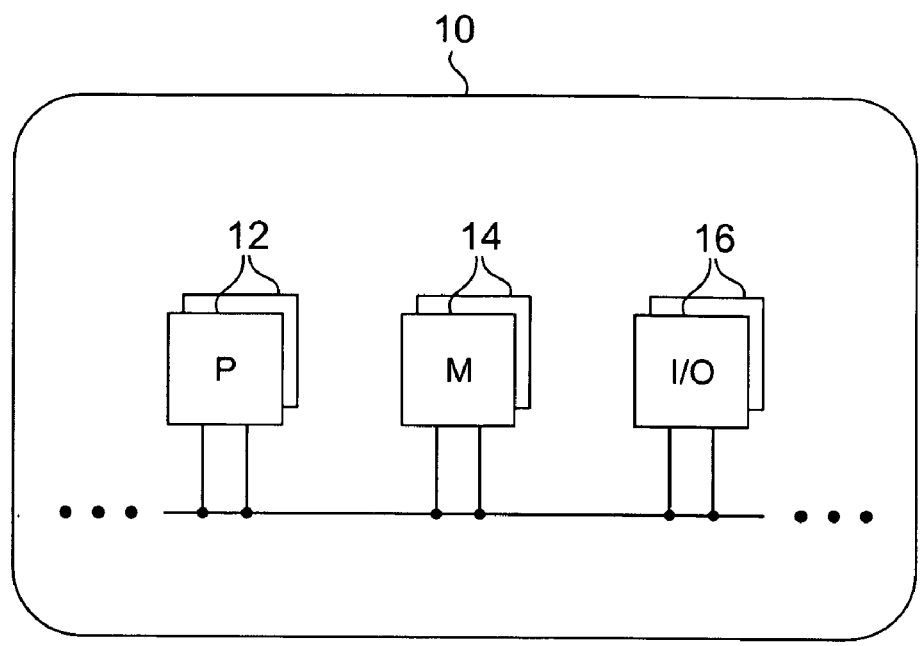
FIG. 1 is a schematic diagram of a processing system for facilitating the implementation of a multi-tasking environment in accordance with the present invention.
Figure 2:
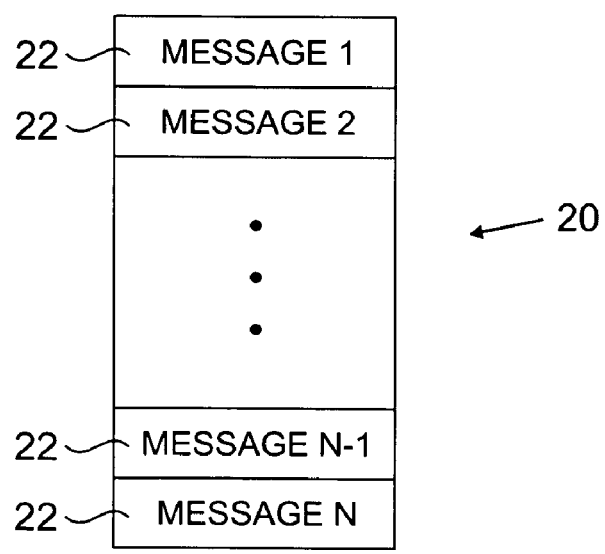
FIG. 2 is an illustration of an exemplary message queue for storing a plurality of messages in the order they were received and/or in the order of occurrence of their corresponding events in accordance with the present invention.

Referring to FIG. 1, there is shown a processing system 10 including at least one processor (P) 12, memory (M) 14, and input/output (I/O) interface 16, connected to each other by a bus 18, for facilitating the implementation of a multi-tasking environment in accordance with the present invention. In such a multi-tasking environment, the processor 12 typically performs a task by retrieving a message from a message queue and processing the message by calling, or invoking, one or more specific functions which are required to perform the task based upon information contained in a message. A message typically identifies an event which is received by the processing system 10 through the input/output interface 16. Alternatively, a message can identify an event which occurs within the processing system 10. In any case, each message is typically stored in the message queue in the order it is received or in the order of occurrence of the corresponding event, which are often one in the same. For example, referring to FIG. 2, there is shown a message queue 20 containing a plurality of messages 22 which are stored in the order they were received and/or in the order of occurrence of their corresponding events. The message queue is typically located in the memory 14.

Figure 3:
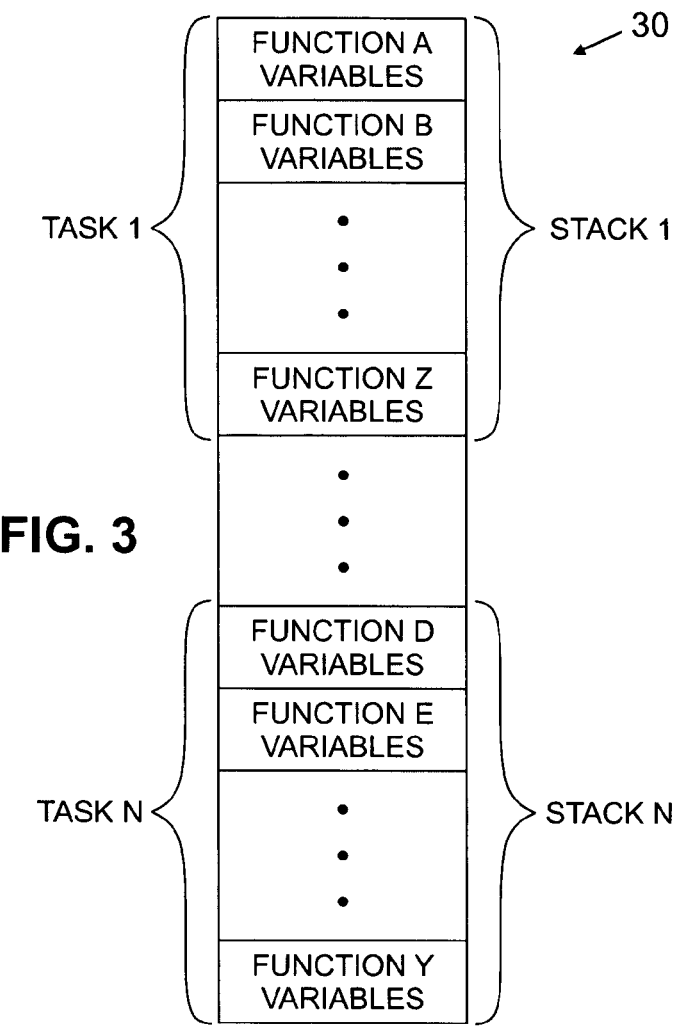
FIG. 3 is an illustration of an exemplary stack structure wherein a task is allocated a stack space in memory for storing variables associated with the different functions that are invoked by the task in accordance with the present invention.

Referring again to FIG. 1, the memory 14 also typically contains operating system software which, when the processing system 10 is initialized, causes the processor 12 to establish a plurality of tasks and allocate a corresponding plurality of dedicated work spaces, or stacks, in the memory 14. Each stack provides a location, or a group of locations, in the memory 14 where function variables may be stored as needed for a corresponding task. For example, referring to FIG. 3, there is shown a stack structure 30 wherein each task is allocated a stack space in the memory 14 for storing variables associated with the different functions that are invoked for each task. It should be noted that, although FIG. 3 shows each stack as encompassing a dedicated range of sequential memory, the present invention allows a stack to encompass a dedicated space of non-sequential memory, as described in detail below.

Referring again to FIG. 1, each task is essentially a collection of functions which are typically established along with their corresponding tasks when the processing system 10 is initialized. Each function typically has a predefined template that includes calling the function, storing function parameters, and local variables. The number of times each function may be called is unknown. The number of functions that may be called is also unknown. The combination of these two factors make the stack size unknown. This is explained on the next page. These memory requirements are typically not fully known at compile time. Thus, due to this lack of knowledge, the amount of stack space that is allocated for each task when the processing system 10 is initialized is often inadequate, and stack overflow and underflow can easily occur without safeguards.

In operation, the operating system software causes the processor 12 to activate a specific task based upon workload demands and priorities. The task begins when the processor 12 retrieves the first message from the message queue and begins processing the message. The processor 12 processes the message by invoking one or more specific functions which are required to perform the task based upon information contained in the message. As each function is invoked, additional stack space is used.

The dynamic aspect of a stack is its depth. That is, the required depth of a stack depends upon how many function variables will be placed on the stack for any single execution thread as function variables are pushed on and popped off the stack in order to process a message. This is non-deterministic in nature due to implementation techniques such as recursion. Thus, due to the non-deterministic nature of the required depth of a stack, the amount of stack space that is allocated for each task when the processing system 10 is initialized is often inadequate, and stack overflow and underflow can easily occur without safeguards.

In accordance with the exemplary embodiment of the present invention, safeguards are employed so as to avoid stack overflow and underflow. That is, a guard frame is inserted at the top and bottom of each stack so as to allow stack corruption caused by stack overflow and underflow to be detected by a guard function. Once the stack corruption is detected, the function which caused the stack corruption to occur can be determined and remedial measures can be taken.

Figure 4:
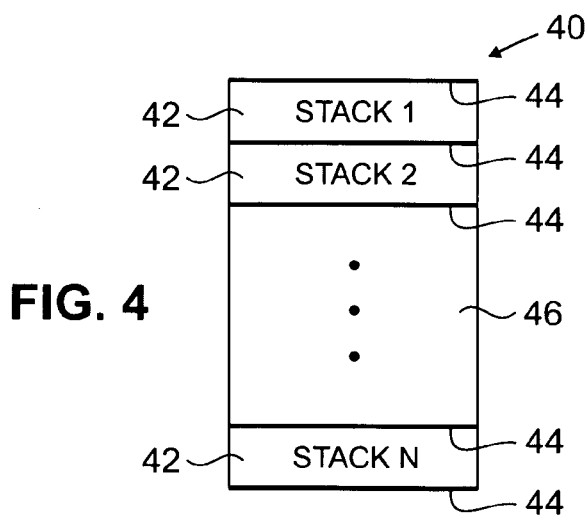
FIG. 4 is an illustration of an exemplary stack structure having a plurality of stacks and a corresponding plurality of guard frames in accordance with the present invention.

Referring to FIG. 4, there is shown a stack structure 40 having a plurality of stacks 42 and a corresponding plurality of guard frames 44 in accordance with the present invention. Each guard frame 44 borders a corresponding stack 42 and preferably comprises a fixed bit pattern that is stored as one or more bytes in the memory 14. For example, a guard frame 44 can be formed of a sequence of bytes containing a bit pattern of alternating ones (i.e., logic level 1) and zeros (i.e., logic level 0). Alternatively, a guard frame 44 can be formed of a sequence of bytes containing an address or instruction which causes the processor 12 to reach some predetermined location or state.

The size of each guard frame 44 is typically implementation dependent, but is always relatively small in comparison to a corresponding stack 42. The key issues are that each guard frame 44 should be large enough to be unique from random data patterns, large enough to provide corruption protection to an adjacent stack, and small enough to not be a performance burden. At this point it should be noted that two physically adjacent stacks (e.g., stack 1 and stack 2 in FIG. 4) may share the same guard frame (e.g., the guard frame 44 located between stack 1 and stack 2 in FIG. 4). However, if two stacks are not physically adjacent (i.e., the two stacks are separated by memory space that is dedicated to another purpose), then a separate guard frame will typically be required for each stack (i.e., the two stacks cannot share a guard frame). For example, if the memory space 46 between stack 2 and stack N was dedicated to another purpose (i.e., memory space 46 was not dedicated to one or more stacks), then there would be no stacks adjacent to either stack 2 or stack N in memory space 46 and neither stack 2 nor stack N could share a guard frame with another stack in memory space 46.

Each time a function variable is pushed on or popped off a stack 42, the appropriate guard frame 44 is checked by a guard function. For example, when a function variable is pushed onto a stack 42, the guard function checks the guard frame 44 at the bottom of the stack 42 to see if an overflow has occurred or might occur based on the minimum space requirements of the function. An overflow occurs when the guard frame 44 has been corrupted (e.g., overwritten) or insufficient memory exists to satisfy the minimum space requirements of the function. If the guard function determines that an overflow has occurred, or might occur, then the guard function records the offending function and task and begins task cleanup and recreation. As part of task cleanup, the guard frame 44 is restored to its pre-corrupted state.

In the opposite case, when a function variable is popped off of a stack 42, the guard function checks the guard frame 44 at the top of the stack 42 to see if an underflow has occurred. An underflow occurs when there are no function variables on the stack 42 and a pop operation is performed In such a case the guard frame 44 would be corrupted. This typically occurs when there is some sort of corruption of the task, the function, or even the stack 42 which causes stack depth confusion. If the guard function determines that an underflow has occurred, then the guard function records the offending function and task and begins task cleanup and recreation. Again, as part of task cleanup, the guard frame 44 is restored to its pre-corrupted state.

At this point it should be noted that the guard function is typically a separate function which is invoked whenever a push or pop operation occurs. That is, the guard function, in conjunction with the guard frame, is a software-based solution to stack overflow and underflow problems which overcomes the shortcomings of traditional solutions such as excess memory allocation and hardware write protect schemes. Furthermore, unlike a prior art software solution, the present invention guard function and guard frame solution does not require a counter to be maintained or a computations to be performed. That is, the present invention guard function and guard frame solution requires minimal overhead.

The present invention guard function and guard frame solution to stack overflow and underflow problems provides a mechanism for detecting stack corruption, preventing corruption of adjacent stacks, and isolating offending functions, tasks, and software. By implementing this mechanism, the reliability of real time embedded controllers is improved. An additional advantage of this solution is that it can be applied to existing systems that lack hardware write protect schemes and to systems that require memory mining.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for detecting corruption associated with a stack in a storage device, the stack encompassing a range of memory of a fixed size, the method comprising the steps of:
   storing a first predetermined value in a first address location immediately preceding the range of memory;
   storing a second predetermined value in a second address location immediately following the range of memory;
   detecting the occurrence of a stack operation within the stack;
   comparing a value in the first address location to the first predetermined value to determine if the stack operation corrupted the first predetermined value stored in the first address location;
   where the stack operation is determined to have corrupted the first predetermined value, restoring the first predetermined value to the first address location;
   comparing a value in the second address location to the second predetermined value to determine if the stack operation corrupted the second predetermined value stored in the second address location; and
   where the stack operation is determined to have corrupted the second predetermined value, restoring the second predetermined value to the second address location.

2. The method as set forth in claim 1, wherein the first predetermined value comprises a known bit pattern.

3. The method as set forth in claim 1, wherein the first predetermined value comprises a processor readable address.

4. The method as set forth in claim 1, wherein the first predetermined value comprises a processor readable instruction.

5. The method as set forth in claim 1, wherein the stack operation inserts data in the stack.

6. The method as set forth in claim 1, wherein the stack operation removes data from the stack.

7. The method as set forth in claim 1, wherein the second predetermined value comprises a known bit pattern.

8. The method as set forth in claim 1, wherein the second predetermined value comprises a processor readable address.

9. The method as set forth in claim 1, wherein the second predetermined value comprises a processor readable instruction.

10. A system for detecting corruption associated with a stack, the system comprising:
    a processor; and
    a storage medium comprising a stack, the stack encompassing a range of memory of a fixed size, wherein the processor is operable to:
    store a first predetermined value in a first address location immediately preceding the range of memory;
    storing a second predetermined value in a second address location immediately following the range of memory;
    detect the occurrence of a stack operation within the stack;
    compare a value in the first address location to the first predetermined value to determine if the stack operation corrupted the first predetermined value stored in the first address location;
    where the stack operation is determined to have corrupted the first predetermined value, restoring the first predetermined value to the first address location;
    comparing a value in the second address location to the second predetermined value to determine if the stack operation corrupted the second predetermined value stored in the second address location; and
    where the stack operation is determined to have corrupted the second predetermined value, restoring the second predetermined value to the second address location.

11. The system as set forth in claim 10, wherein the first predetermined value comprises a known bit pattern.

12. The system as set forth in claim 10, wherein the first predetermined value comprises a processor readable address.

13. The system as set forth in claim 10, wherein the first predetermined value comprises a processor readable instruction.

14. The system as set forth in claim 10, wherein the stack operation inserts data in the stack.

15. The system as set forth in claim 10, wherein the stack operation removes data from the stack.

16. The system as set forth in claim 10, wherein the second predetermined value comprises a known bit pattern.

17. The system as set forth in claim 10, wherein the second predetermined value comprises a processor readable address.

18. The system as set forth in claim 10, wherein the second predetermined value comprises a processor readable instruction.

* * * * *